H. H. MILLER.
CORN PLANTER.
APPLICATION FILED MAY 5, 1908.
919,051.
Patented Apr. 20, 1909.
4 SHEETS—SHEET 1.
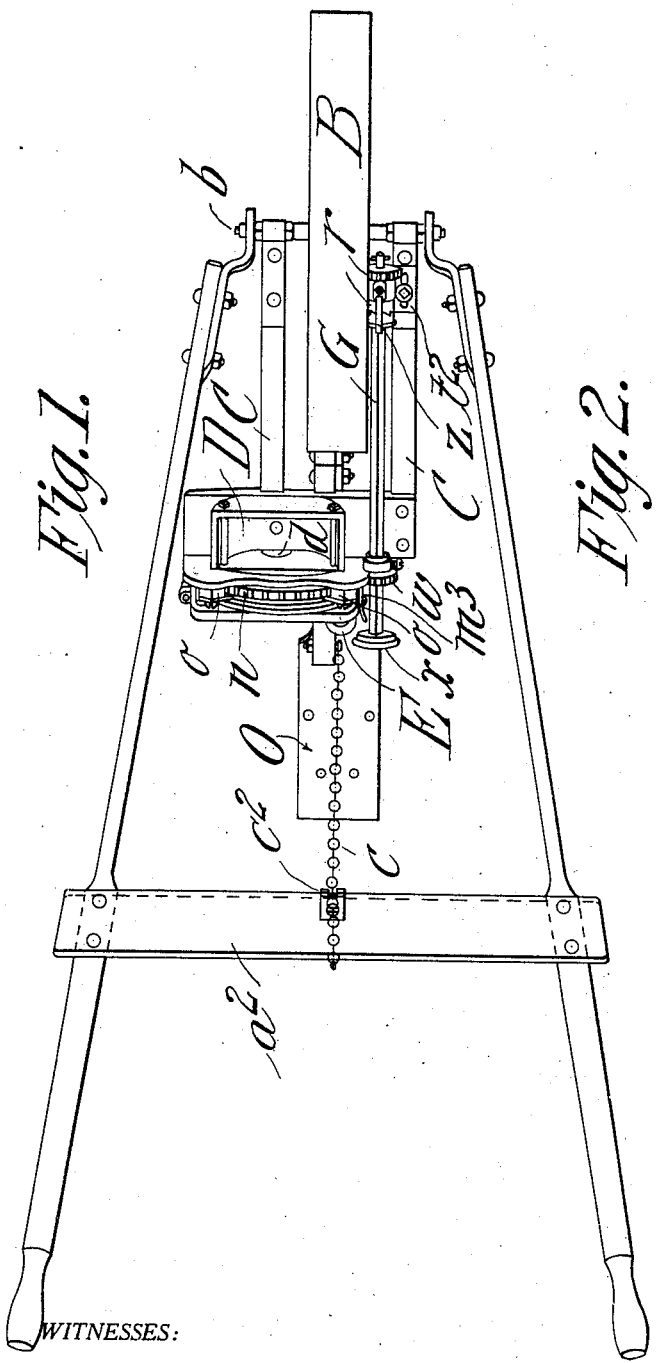
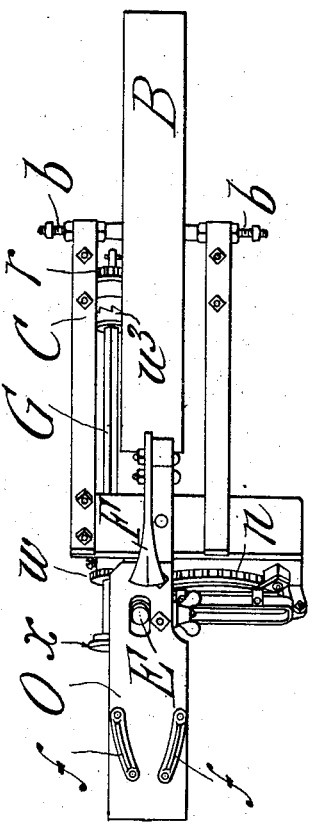
WITNESSES:
H. L. Sprague
R. M. Mowry
INVENTOR,
Horace H. Miller.
BY
ATTORNEY.

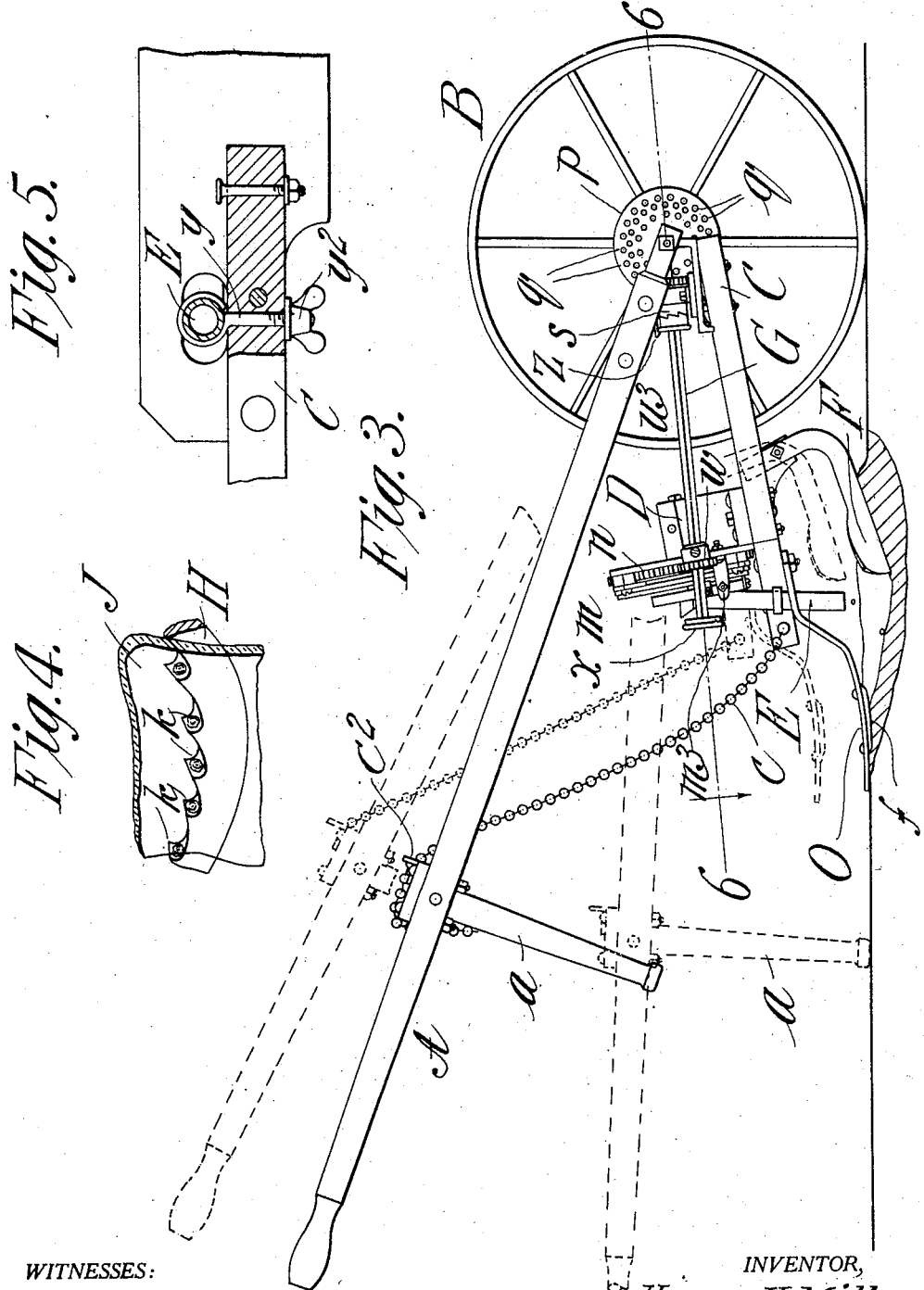

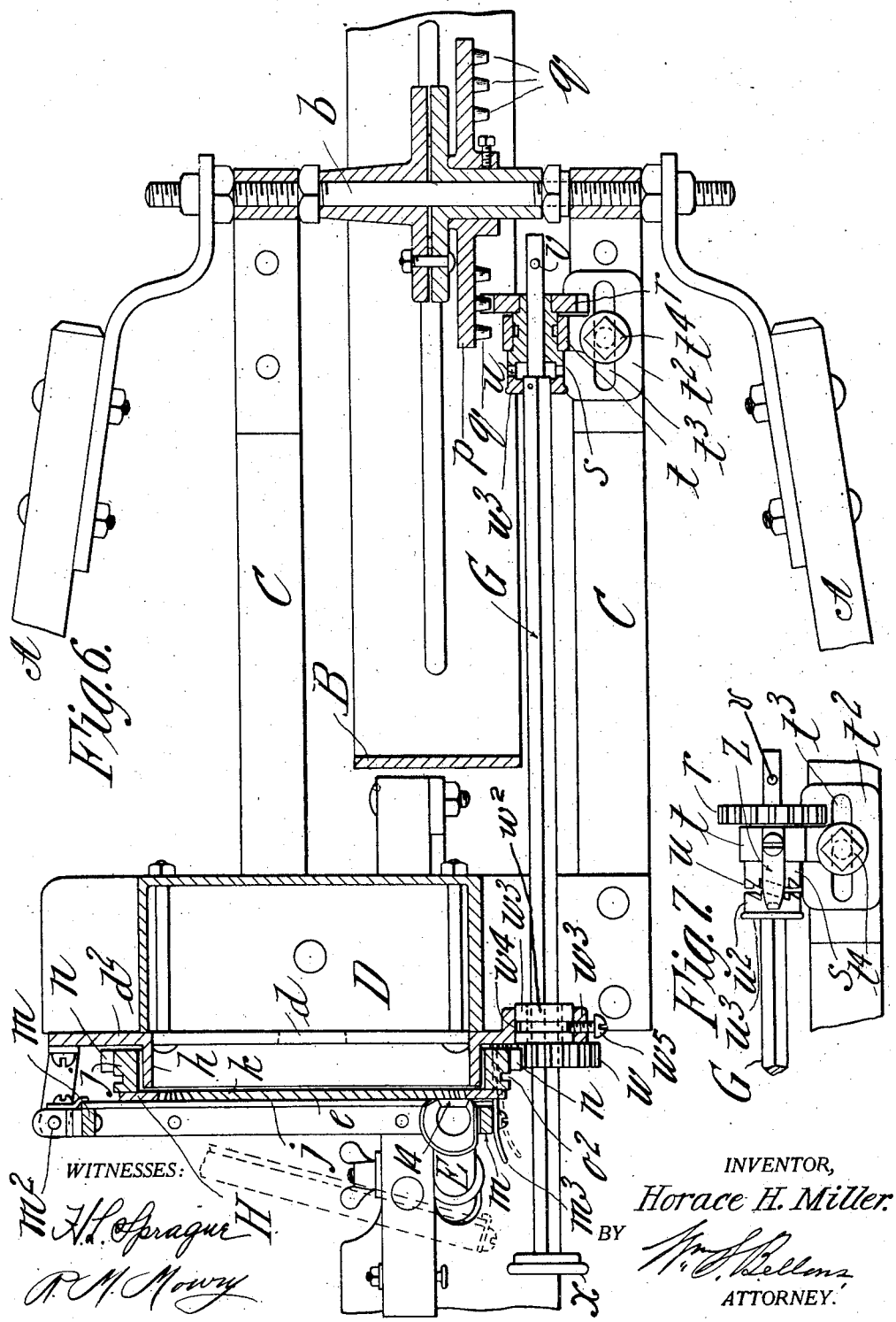

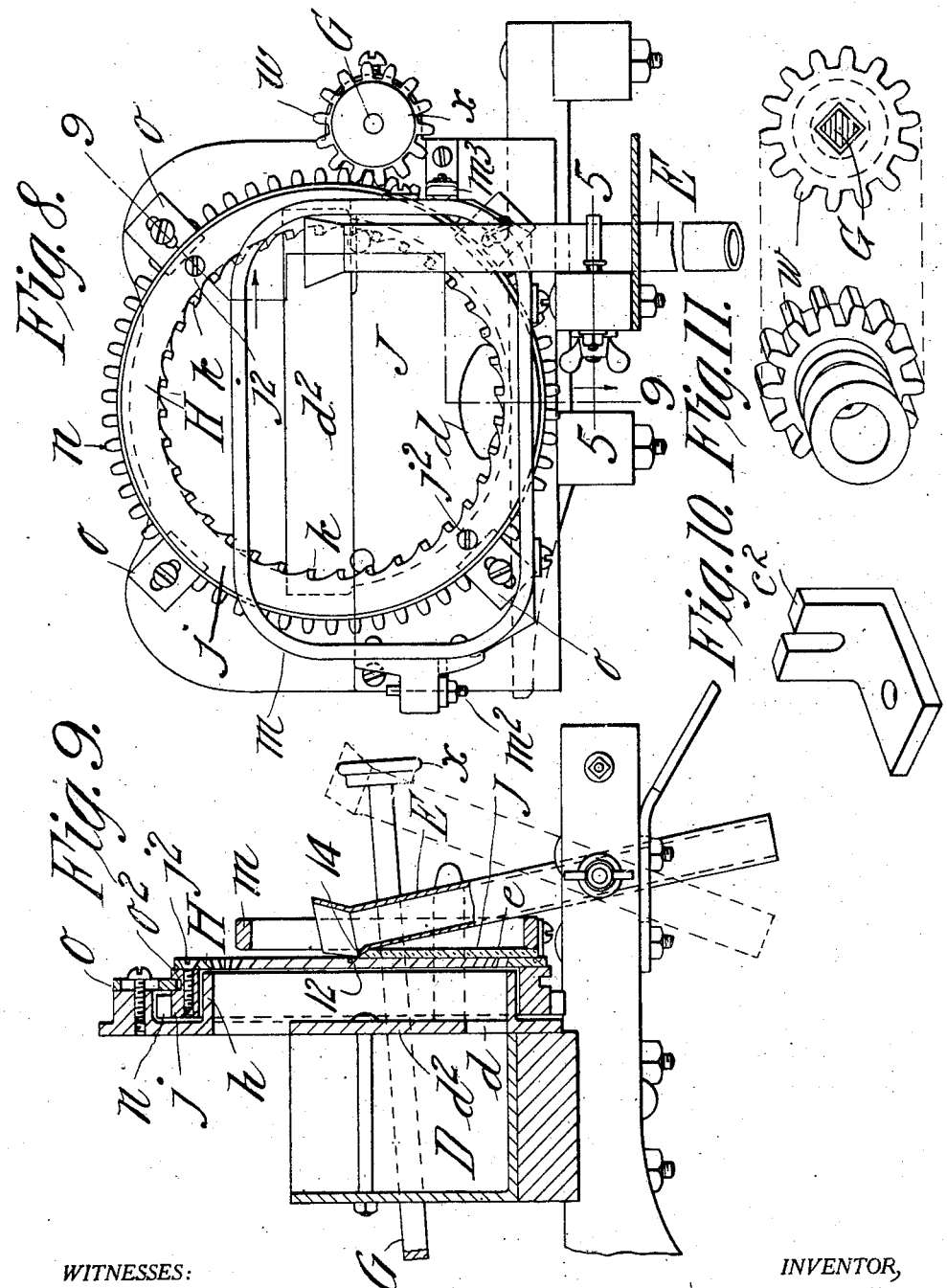

UNITED STATES PATENT OFFICE.

HORACE HERBERT MILLER, OF LYNDONVILLE, VERMONT.

CORN-PLANTER.

No. 919,051.     Specification of Letters Patent.     Patented April 20, 1909.

Application filed May 5, 1908. Serial No. 430,951.

*To all whom it may concern:*

Be it known that I, HORACE HERBERT MILLER, a citizen of the United States of America, and resident of Lyndonville, in the county of Caledonia and State of Vermont, have invented certain new and useful Improvements in Corn-Planters, of which the following is a full, clear, and exact description.

The present seed planting machine is an improvement over the structure disclosed in my Patent No. 889947, granted June 9, 1908, and comprises improved mechanism and devices mounted on a wheeled frame, operative, as the machine is trundled or pushed and advanced to form a furrow to receive the seeds, to deliver the seeds, one at a time, at regular distances apart, and to cover the seeds deposited in the furrow with the dirt just previously thrown up from the furrow.

The machine also comprises a means for operating the seed conveying and delivering mechanism so that the seeds may be deposited in the furrow at predetermined distances apart.

The machine also includes provisions whereby when the machine is drawn or trundled rearwardly, instead of being forwardly propelled for its usual seed planting operation, the seed feeding mechanism will become inactive and be without effect to agitate or churn the seeds in the hopper or receptacle therefor.

Other objects incidental to the operation of a highly practical and efficient seed planting machine are attained in and by the arrangements of the devices and the constructions thereof, as hereinafter explained. And the invention consists in the combinations, arrangements, and constructions of parts substantially as hereinafter described and set forth in the claims.

In the drawings:—Figure 1 is a plan view of the seed planting machine; Fig. 2 is an inverted plan more especially showing the under side of the plow and furrow closer; Fig. 3 is a side elevation of the machine; Fig. 4 is a perspective view to show the important structural features of the seed feeding ring in relation to a wall with which it coöperates; Fig. 5 is a horizontal sectional view on line 5—5 of Fig. 8, showing a detail of construction pertaining to the seed feeding spout; Fig. 6 is a substantially horizontal longitudinal sectional view, on a larger scale, on line 6—6, Fig. 3. Fig. 7 is a plan view of a clutch device which is represented in section in Fig. 6; Fig. 8 is a rear elevation of the seed feeding mechanism; Fig. 9 is a vertical sectional view taken on line 9—9, Fig. 8. Figs. 10 and 11 are perspective views of parts hereinafter referred to.

In the drawings,—A represents the supporting and propulsion frame of the seed planting machine, comprising forwardly convergent bars, having rear end handles and legs $a$, intermediately united by a cross bar $a^2$, and mounted at their forward ends on the axle $b$ for a centrally disposed traction wheel B. A subsidiary or secondary frame C is also at its forward end pivotally hung on the wheel axle, normally inclined downwardly and rearwardly therefrom, and has, connected at its rear end, a chain $c$, the free end portion of which is engaged through a notched lug $c^2$ on the cross member $a^2$ of the handle frame.

The secondary frame has mounted on the rear portion thereof a seed receptacle D which has the form of a semi-cylindrical upwardly open hopper, having at the rear lower portion thereof an aperture $d$ through which a small quantity of the mass of seeds provided in the receptacle may rearwardly pass into a secondary chamber formed between the rear wall of the receptacle proper and the plate of glass $e$, or other suitable material, the upper edge of which plate is in proximity with the upper open end of the downwardly leading spout E supported on the frame C and having the lower open end thereof in proximity to the ground at the line of the furrow made by the plow F as the machine is forwardly moved, and almost directly thereafter closed by the furrow closing lips $ff$ carried on a flat downwardly inclined plate O which in the operation of the machine has a dragging action along the ground.

As shown in Fig. 6, the seed receptacle D is made, behind its rear vertical wall $d^2$ which has the aforementioned aperture $d$ therein, with a rearwardly open extension comprising the annular flange $h$ the upper circular part of which extends above the open top of the receptacle; and a ring $j$ having spur gear teeth $n$ is loosely fitted about said flange, which constitutes an annular support therefor. The said gear toothed ring $j$ has removably secured on its rearward face by screws $j^2$ a ring H having its location in a plane next to the rearwardly located circular edge of the flange $h$; and said ring has, internally, regularly spaced ratchet-like pocket forming teeth $k$ $k$ which are transversely and rearwardly inclined relatively to the face of the ring, as particularly represented in Figs. 4 and 8. The outer face of the ring H moves substantially in contact with the plate J, preferably of glass, the same being carried on a frame $m$ supported on a hinge $m^2$ at one rear side portion of the receptacle, and detachably held in its closed position by a snap catch $m^3$ at the other side. The delivery spout E has the forwardly turned lip 14 at the edge of its flaring upper open end resting directly against plate J at the beveled upper edge of the latter, and sidewise removed from the central line of the receptacle so as to be adjacent the revoluble path of movement of the pocket forming teeth of the seed feeding ring.

In Fig. 8, the plate J being transparent, does not conceal from view the portions of the apparatus which are next beyond it. The toothed ring $j$ is retained against displacement on the annular flange $h$ about which it revolves by lugs $o$ which are secured by screws on the rear wall of the seed receptacle frame, which lugs edgewise enter a peripheral groove $O^2$ in the ring. The revoluble movement of the gear toothed ring $j$ and the pocket including seed feeding ring H which is carried as one therewith, is in consequence of the forward movement of the wheeled frame as pushed by the user through driving connections as follows: Affixed on the hub of the traction wheel B is a disk $p$ having on the outer face thereof sets of cog studs $q$ in three concentric circles; and in mesh with the cog studs of some one of the circles is a spur gear wheel $r$ carried at the forward end of a sleeve $s$ which is mounted for rotation in a circular bearing in a bracket $t$, said bracket being by its foot piece $t^2$ adjustably secured on one of the side bars of the secondary frame C. While the said gear carrying sleeve $s$ is freely rotatable in the bearing $t$ therefor, it is incapable, normally, of endwise movement, and said sleeve at its end which is rearwardly projected beyond the journal support $t$ has a series of ratchet-shaped clutch teeth $u$ in engagement with which are the similar ratchet-shaped clutch teeth $u^2$ on a circular clutch member $u^3$ which is affixed to the longitudinally ranging, cross sectionally square shaft G near the forward end of the latter,—the extreme forward end portion of the shaft G being round in cross section and playing freely through and endwise forwardly beyond the gear carrying sleeve $s$; and $v$ represents a stop pin for preventing an undue extent of rearward longitudinal sliding movement of the shaft. The polygonal shaft G toward its rearward end is slidably engaged through a correspondingly shaped opening axially through a spur gear wheel $w$ and its hub $w^2$, the teeth of said spur gear wheel $w$ being in constant mesh with the teeth $n$ circumferentially provided on the ring $j$ which carries the annular seed feeding member H. Said gear $w$ is retained against axial displacement by having the hub thereof, which is fitted through a circular journal support $w^3$ therefor, constructed with a peripheral groove $w^4$ engaged in which is the inner extremity of a screw or stud $w^5$ which penetrates the bearing support $w^3$. At the rear end of the shaft G, rearwardly beyond the intermeshing gears $w$ and $n$, is a head or enlargement $x$.

It will be here explained that the ratchet-shaped teeth $u$ and $u^2$ respectively on the hub $s$ of the gear $r$ and on the circular clutch member $u^3$ are so inclined, and the faces of the teeth are so perpendicular to the axis of the parts on which they are formed, that when the traction wheel B is running forwardly and the parts $u^3$ and $s$ are "in clutch" they will so remain, there being no force or effect to cause them to be thrown out of clutch; but in case the machine is trundled in a rearward direction and the traction wheel B is reversely turned, the effect of the inclined teeth on the part $s$ will be to crowd the part $u^3$ rearwardly and fully out of clutch; and hence, the latter action is a highly advantageous one for the reason that it is requisite that the shaft G shall turn to cause the feeding movement of the seed feeding member H only when the machine is forwardly propelled for planting, and also that it is desirable, when the machine may be drawn in a rearward direction instead of being pushed that the seed feeding member H shall remain immovable, as thereby unnecessary agitation or churning up by the member H of the seeds in the hopper is avoided.

The operation of the machine will be now described: A quantity of seeds to be planted in drills is supplied in the feed receptacle D, the suspension chain on the secondary frame C is arranged so that such frame may have its normal downwardly and rearwardly inclined position for the plow and furrow closer to operate on the ground. The handle frame being grasped in the manner of the handles of a wheel barrow and thereby properly raised about as represented by the full lines in Fig. 3, the machine, in advancing causes, through the driving connections between the traction wheel B and the gear wheel $n$, a revoluble movement at moderate speed of the pocket seed feeding wheel. It will be here explained that the rearward end of the shaft G is so located, as will be perceived in Figs. 1 and 3, that the operator, preparatory to pushing the machine forwardly for seed planting may, after raising the handle frame, impart by a kicking movement of the foot against the shaft enlargement $x$ a forward sliding motion to the shaft G to place the clutch member $u^3$, which is non-rotatable relatively to the shaft, in clutch with the part $s$ which is unitary with the gear wheel $r$ in mesh with one of the circular series of cogs on the disk $p$ which turns as one with the traction wheel B. It will also be explained that although the bottom of the seed receptacle D is, while the machine is being operated, somewhat downwardly and rearwardly inclined, whereby the seeds have a tendency to gravitate toward the plate J, the restricted opening $d$ through the lower portion of the partition walls of the seed hopper, while permitting the discharge of a sufficient quantity of seeds therethrough prevents any great banking up of the seeds against the plate J within the supplemental chamber in the hopper. The seeds do, however, settle or fill into each of the pockets in the annular ring plate H, and by the inclination of the bases of such pockets rearwardly and toward the plate J, the seeds have the tendency, as the plate moves in its circular course, to settle and impinge against the inner face of the plate, and to be, on the other hand, without any tendency to be displaced from their pocketing in the feed ring after having once assumed the position therein as represented in Fig. 4. Now, so soon as a seed in a given pocket reaches the height represented at 12 in Fig. 9, at or slightly above the upper edge of the plate J, it is free to roll, and will roll, or slide, along the downwardly and rearwardly inclined base of the pocket and across the upper edge of the plate J of the outwardly turned lip 14 of the spout E which overlaps the edge of the plate, and will fall and be guided through the spout into the furrow formed by the plow, which is positioned slightly in advance of the lower open delivery end of the spout. By the time the seed in the next pocket is brought up to the position for its liberation over the edge of the plate J and into the spout, the machine has bodily progressed a suitable distance so that the next seed falls into the furrow at a proper spacing from the previously delivered one; and so on throughout the entire line of the drill; and, of course, it is apparent that the rearwardly convergent lips of the furrow closer almost immediately after the depositing of the seed in the drill automatically close the furrow and cover the seed with earth.

By making the plate J of glass, and consequently transparent, the user of the machine may always observe from the rear that the seed supply in the receptacle is ample and that the seeds are being carried partially around, and upwardly for delivery, without any skipping, into the guide spout.

In the drawings, Fig. 6, the gear wheel $r$ is shown as adjusted to be in mesh with the cogs or teeth $q$ in the intermediate one of the three circles of such teeth on the face of wheel $p$ which revolves as one with the traction wheel B, and consequently there will be a feeding and planting of the seeds with moderate spacings; should it be desired to have the seeds planted closer together, the journal bracket $t$ in which the hub of the gear wheel $r$ is carried may be adjusted rearwardly on the frame, as permitted by the provision of the slot $t^3$ in the foot piece of the bracket and the clamping bolt $t^4$ engaging through the slotted foot piece in the member of the frame C in which the bracket is mounted. From this rearward adjustment it will be understood that the gear wheel $r$ and the driving connections between it and the seed feeding ring H will have faster motions and feed the seeds more frequently in a given distance traveled by the machine; and on the other hand by adjusting the gear wheel $r$ forwardly to be in mesh with the cogs $q$ in the smallest circle, a considerably slower revoluble movement of the seed feeding ring may be acquired with a delivery and planting of the seeds at correspondingly greater, though uniform distances apart.

For different characters of seeds I may employ interchangeable rings H having pocket forming teeth, the same in principle and character as described, but modified as to distance of separation and also as to their base widths to correspond with different sizes, shapes and characters of seeds or other articles to be planted,—one being easily removed by taking out the screws $j^2$ and a new one replaced; and in this connection will be appreciated the advantage of mounting the glass plate J on the hinged frame before mentioned, as thereby the frame and plate may be swung rearwardly and off to one side, leaving a clear way for the removal and replacement of seed feeding rings as occasion requires and inasmuch as the spout E must also have its position shifted in order that the hinge frame may be swung across the normal line of the spout, a swinging support for the spout is provided which consists of an eye bolt $y$, Fig. 5, the eye of which embraces the intermediate part of the spout while the shank of the bolt extends horizontally through a member of the frame C and receives on its screw threaded extremity the thumb nut $y^2$, which latter when tightened draws the ring eye to a point for clamping the spout against the side of the frame, while, manifestly, the loosening of the nut leaves the eye bolt and spout free for any desired amount of oscillatory movement.

When the user of the machine desires to rest, he merely lays the handle down to the lower position shown by dotted lines in Fig. 3; and if he desires to run the machine over the ground forwardly and to have the machine non-effective for seed feeding and delivery, he has merely to first draw the machine a few inches rearwardly with the result that the inclined faces of the clutch $u$ on the hub of the gear $r$ will crowd the clutch member $u^3$ entirely out of clutch so that then on any forward trundling of the machine no motion will be imparted from the traction wheel to the transmission shaft G. And inasmuch as when the operator has to push the machine for long distances without its seed feeding he usually draws up the chain $c$ and newly engages it in the notched lug $c^3$, thereby elevating the secondary frame C and the mechanism carried thereby more nearly to the level or line of the handle frame, and then, when the handle frame is raised and the machine is forwardly pushed in the manner of a wheel-barrow, because there might be a gravitative tendency of the clutch member $w^3$ and the shaft G on which it is affixed, to slide forwardly to bring the member $w^3$ into clutch, a spring detent $z$ is applied to act as a stop to prevent the member $w^3$ from being self moving into clutch. This detent is made in the form of a flat spring strip secured on the top of the journal bracket $t$ and extending over and having its extremity in spring bearing against the peripheral portion of the clutch member $w^3$. But whenever a person is in readiness to plant at the starting end of a drill, he has only to force the shaft G slightly endwise forwardly, which in practice and most conveniently is done with the foot, while grasping and holding, properly raised, the handles of the frame A, and the capabilities described and explained are of great advantage and value in this machine, that is it is most satisfactory to put the machine into clutch for planting whenever such is desired to be done, and fully as satisfactory that the machine will automatically become non-effective for any motion, either in the forward or rearward direction, of the seed feeding ring H whenever the operator imparts a very slight rearwardly drawing movement to the machine. It may also be stated of the chain $c$ that it serves the purpose of adjusting the secondary frame C relatively to the handle frame, conducing to the convenience of persons of varying heights who may have occasion to make use of the seed planter.

I claim:—

1. In a seed planting machine, in combination, a driving gear wheel, seed planting means located rearwardly of said gear wheel, stationary bearings, front and rear pinions, pinions having hub portions journaled in said bearings, the front pinion being driven by said gear wheel, the rear pinion driving said seed planting means, a square shaft passed through the rear pinion and having a rounded front end portion passed through the front pinion, said shaft being mounted for axial sliding movement through said pinions, and having a rearwardly projecting portion, a clutch member secured to the front pinion and a companion clutch member fixed to the shaft.

2. In a seed planting machine, in combination, a supporting frame, seed planting means thereon, a ground wheel, a gear wheel attached thereto, a gear wheel operating the seed planting means, a pinion meshing with said first gear wheel, a clutch member attached to said pinion, a square shaft mounted for rotation and for axial sliding movement and provided with a clutch member for engagement with said first clutch member upon corresponding axial movement of the shaft, a pinion provided on said shaft and engaging said second gear wheel, and a fixed leaf spring constructed to engage said last named clutch member and to hold the same out of engagement with its companion clutch member.

3. In a seed planting machine, in combination, a driving pinion, a driven pinion, said planting means operated by the driven pinion, a shaft constructed to rotate the driven pinion and means for rotating said shaft from the driving pinion comprising a clutch member secured to the driving pinion, a companion clutch member mounted on the shaft to transmit rotation thereto and being movable into or out of engagement with the driving pinion and a leaf spring having a fixed mounting and having a projecting portion formed to engage said companion clutch member, and to hold the same out of engagement with said first named clutch member.

4. In a seed planting machine, in combination, a supporting frame, a face gear wheel having concentric annular rows of teeth, seed planting means, gearing between said seed planting means and said face gear and including as an element thereof a driving pinion associated with said face gear, a bracket having a base portion and a bearing portion to receive the hub of the pinion, said base portion being formed with a longitudinal slot, and fastening means engaged through the slot and into a frame part, said bracket being adjustably movable to vary the position of said pinion with relation to the rows of teeth of said face gear.

HORACE HERBERT MILLER.

Witnesses:
HARLAND B. HOWE,
MAE L. LACASSE.